US008443068B2

United States Patent
Lee et al.

(10) Patent No.: US 8,443,068 B2
(45) Date of Patent: May 14, 2013

(54) METHOD AND SYSTEM FOR MANAGING USER PREFERENCE PROFILES IN A NETWORK

(75) Inventors: Kyung-Tak Lee, Suwon-si (KR); Arunprasath Ramamoorthy, Bangalore (IN); Basavaraj Jayawant Pattan, Bangalore (IN); Venkateswar Jeedigunta, Bangalore (IN)

(73) Assignee: Samsung Electronics Co., Ltd (KR)

( * ) Notice: Subject to any disclaimer, the term of this patent is extended or adjusted under 35 U.S.C. 154(b) by 26 days.

(21) Appl. No.: 12/672,644

(22) PCT Filed: Aug. 8, 2008

(86) PCT No.: PCT/KR2008/004631
§ 371 (c)(1),
(2), (4) Date: Dec. 27, 2010

(87) PCT Pub. No.: WO2009/020373
PCT Pub. Date: Feb. 12, 2009

(65) Prior Publication Data
US 2011/0093577 A1   Apr. 21, 2011

(30) Foreign Application Priority Data
Aug. 8, 2007 (IN) ............................ 1755/CHE/2007

(51) Int. Cl.
*G06F 15/173* (2006.01)
(52) U.S. Cl.
USPC ............................................... 709/223
(58) Field of Classification Search ............ 709/223
See application file for complete search history.

(56) References Cited

U.S. PATENT DOCUMENTS

| 2003/0084165 A1* | 5/2003 | Kjellberg et al. | 709/227 |
| 2005/0221821 A1 | 10/2005 | Sokola et al. | |
| 2008/0133716 A1* | 6/2008 | Rao et al. | 709/220 |
| 2008/0177626 A1* | 7/2008 | Nguyen | 705/14 |
| 2009/0193329 A1* | 7/2009 | Oh et al. | 715/234 |

FOREIGN PATENT DOCUMENTS

| JP | 2002-342244 | 11/2002 |
| JP | 2003-345908 | 12/2003 |
| JP | 2004-127155 | 4/2004 |

(Continued)

OTHER PUBLICATIONS

Nikkei Communications, WiMAX, Japan, Jul. 15, 2007.

*Primary Examiner* — Hussein Elchanti
*Assistant Examiner* — Maceeh Anwari
(74) *Attorney, Agent, or Firm* — The Farrell Law Firm, P.C.

(57) ABSTRACT

A method includes creating a plurality of user preference profiles. Each user preference profile includes at least one of a profile format without active user preference profile indication, a profile format including an active user preference profile indication, and a profile format specific to each device of a user. The plurality of user preference profiles are stored in a shared server. One or more user preference profiles corresponding to a plurality of devices are activated. The one or more user preference profiles are provided to an application server. The application server implements preferences included in corresponding user preference profile. A system includes a plurality of devices of the user, a plurality of clients corresponding to the plurality of devices, an application server corresponding to the plurality of clients, and a shared server for storing a plurality of user preference profiles.

17 Claims, 7 Drawing Sheets

FOREIGN PATENT DOCUMENTS

| | | |
|---|---|---|
| KR | 1020050068823 A | 7/2005 |
| KR | 1020050080972 A | 8/2005 |
| WO | WO2007/049928 A1 | 5/2007 |
| WO | 2008016263 * | 2/2008 |

* cited by examiner

METHOD AND SYSTEM FOR MANAGING USER PREFERENCE PROFILES IN A NETWORK

FIELD OF THE INVENTION

The present disclosure relates to the field of communications in a network and more particularly to the field of managing user preference profiles in the network.

BACKGROUND

Over a period of time, the number of services provided by service providers in a network has increased. The service providers allow a user to choose preferences to customize behavior of various applications, for example messaging application, according to the user needs. However, the number of preferences available to the user is huge and the user needs to manage the preferences for each application which is difficult for the user to handle.

Currently existing techniques provides the user an option to create user preference profiles for managing settings of various applications. The user preference profiles are stored at a shared location thereby reducing the complexity of settings maintenance. However, the user preference profiles are created per application. In cases where the user accesses a similar application from a different device then the user needs to make modifications to the existing user preference profile. Further, when the user makes modifications to the user preference profile previous settings are lost. The complexity that the user has to face worsens in cases where the user uses multiple devices.

In light of the foregoing discussion there remains a need for an efficient technique for managing user preference profiles in a network.

SUMMARY

Embodiments of the present disclosure described herein provide a method and system for managing user preference profiles in a network.

An example of a method for managing user preference profiles of a plurality of devices of a user in a network includes creating a plurality of user preference profiles. Each user preference profile includes at least one of a profile format without active user preference profile indication, a profile format including an active user preference profile indication, and a profile format specific to each device of a user. Further, the method includes storing the plurality of user preference profiles in a shared server. The method also includes activating at least two user preference profiles corresponding to the plurality of devices. Each user preference profile corresponds to a device of the user. Moreover, the method includes providing the at least two user preference profiles to an application server. The application server implements preferences included in the at least two user preference profiles.

Another example of a method for managing user preference profiles of a plurality of devices of a user in a network includes creating a plurality of user preference profiles. Each user preference profile includes at least one of a profile format without active user preference profile indication, a profile format including an active user preference profile indication, and a profile format specific to each device of a user. Further, the method includes storing the plurality of user preference profiles in a shared server. The method also includes activating one or more user preference profiles corresponding to the plurality of devices. Moreover, the method includes providing the one or more user preference profiles to an application server. The application server implements preferences included in the one or more user preference profiles.

An example of a system for managing user preference profiles for a user includes a plurality of devices of the user. The system also includes a plurality of clients corresponding to the plurality of devices. Further, the system includes an application server corresponding to the plurality of clients. Moreover, the system includes a shared server for storing a plurality of user preference profiles. Each user preference profile includes at least one of a profile format without active user preference profile indication, a profile format comprising an active user preference profile indication, and a profile format specific to each device of the user. Each client activates a user preference profile stored in the shared server for a corresponding device and the application server implements preferences included in the user preference profile for the corresponding device.

BRIEF DESCRIPTION OF FIGURES

The accompanying figures, similar reference numerals may refer to identical or functionally similar elements. These reference numerals are used in the detailed description to illustrate various embodiments and to explain various aspects and advantages of the present disclosure.

Persons skilled in the art will appreciate that elements, in the figures are illustrated for simplicity and clarity and may have not been drawn to scale. For example, the dimensions of some of the elements in the figures may be exaggerated relative to other elements to help to improve understanding of various embodiments of the present disclosure.

DETAILED DESCRIPTION

The patent application with international publication number WO 2008/016263 A1 assigned to SAMSUNG ELECTRONICS CO., LTD. filed on Aug. 1, 2007 is incorporated herein by reference.

Throughout the patent application the term "active profile" is used to mean a user preference profile that is activated or indicated as an active profile. Further, Request for Comments (RFC) mentioned in the patent application are Internet Engineering Task Force (IETF) defined standards.

It should be observed that method steps and system components have been represented by conventional symbols in the figures, showing only specific details that are relevant for an understanding of the present disclosure. Further, details that may be readily apparent to person ordinarily skilled in the art may not have been disclosed. In the present disclosure, relational terms such as first and second, and the like, may be used to distinguish one entity from another entity, without necessarily implying any actual relationship or order between such entities.

Embodiments of the present disclosure described herein provide a method and system for managing user preference profiles in a network.

Figure 1:
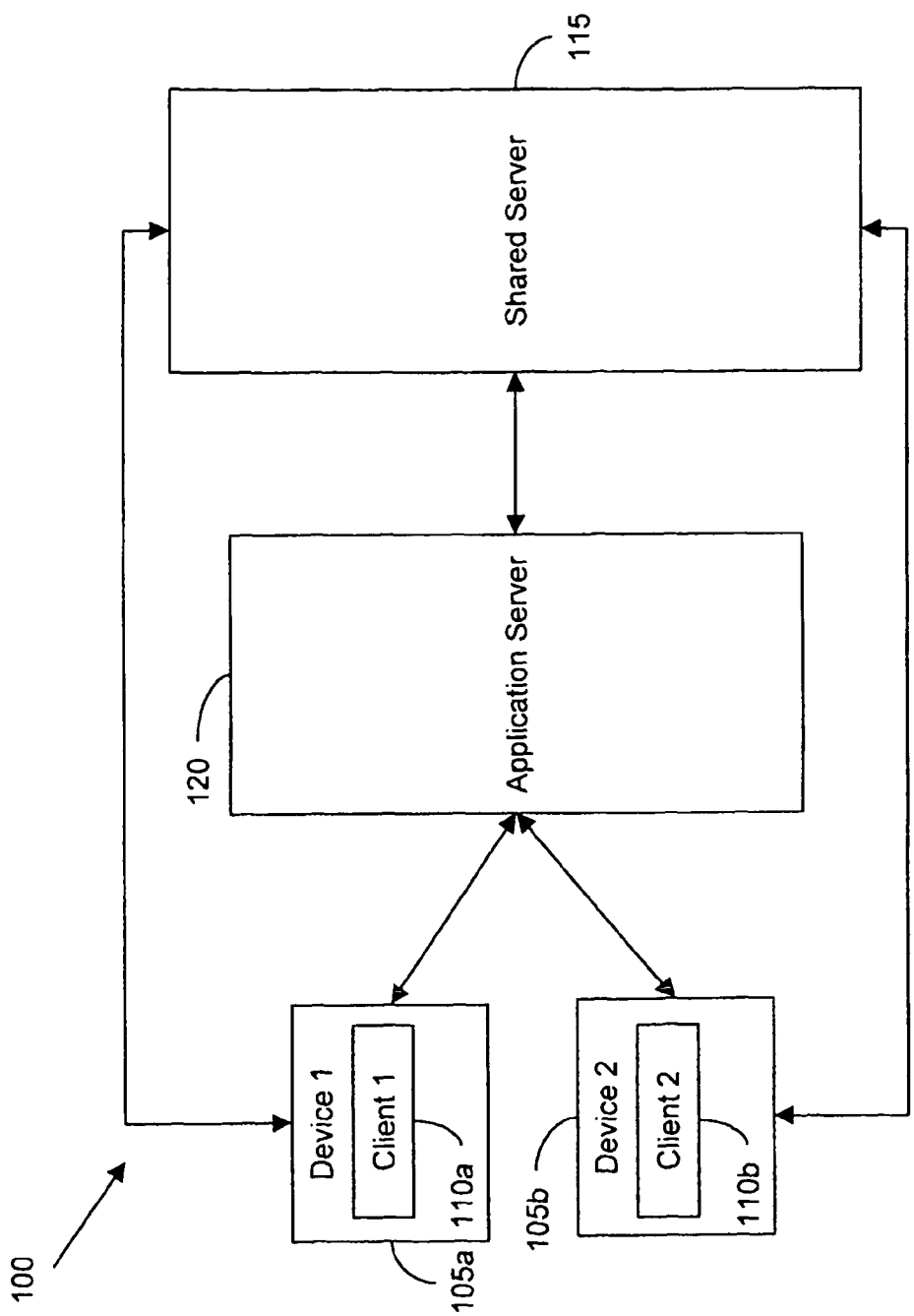
FIG. 1 is a block diagram of a system in accordance with one embodiment.

FIG. 1 is a block diagram of a system 100 in accordance with one embodiment. Examples of the system 100 include but are not limited to a Session Initiation Protocol (SIP) based network and open mobile alliance based architecture. The system 100 includes a plurality of devices corresponding to a user, for example a device 105a and a device 105b. The user can be registered from the devices. Each device includes a client, for example the device 105a includes a client 110a and the device 105b includes a client 110b. Examples of the devices include but are not limited to mobile devices, computers, laptops, data processing units, hand held devices, communication devices and personal digital assistants (PDAs). Examples of the clients include but are not limited to Extensible Markup Language (XML) Document Management (XDM) client. Various applications can run on the devices. Examples of the applications include but are not limited to converged Internet protocol messaging (CPM), instant messaging (IM), push to talk over cellular (PoC) or any other messaging application. The devices can also include a client corresponding to each application, for example a PoC client for the PoC application.

Users of the devices can create and store multiple user preference profiles for various applications on a shared server 115. Examples of the shared server 115 include but are not limited to XDM server (XDMS) or any other network repository. Examples of the user preference profiles include Home profile, Office profile, Travel profile, Sleep profile or any other profile including specific settings. A user preference profile includes user preferences, service settings for various applications, rules, preferences, policies or any other preferences or settings that can be set by user. Examples of service settings for PoC application include but are not limited to incoming session barring, answer mode, incoming instant personal alert barring and simultaneous PoC session support settings. Examples of service settings for IM include but are not limited to incoming session barring, incoming IM pager mode barring and delivery of deferred messages.

Each client indicates a user preference profile for activation for corresponding device to an application server 120. The application server 120 fetches the user preference profile from the shared server 115 and implements preferences included in the user preference profile for the corresponding device.

It will be appreciated that the system 100 can include other elements. For example, an aggregation proxy for enabling communication between the clients and the shared server 115. Each application can have a client and a server for example, PoC client, PoC server and PoC XDMS. It will also be appreciated that the application server 120 can further include one or more servers.

It will be appreciated that the user can register the devices for same or different subscriptions.

The user preference profiles can be created and stored by the clients in various profile formats. The user preference profile includes at least one of a profile format without active user preference profile indication, a profile format including an active user preference profile indication for a device, and a profile format specific to each device of the user. A method for creating and modifying the user preference profiles is explained in conjunction with FIG. 2.

Figure 2:
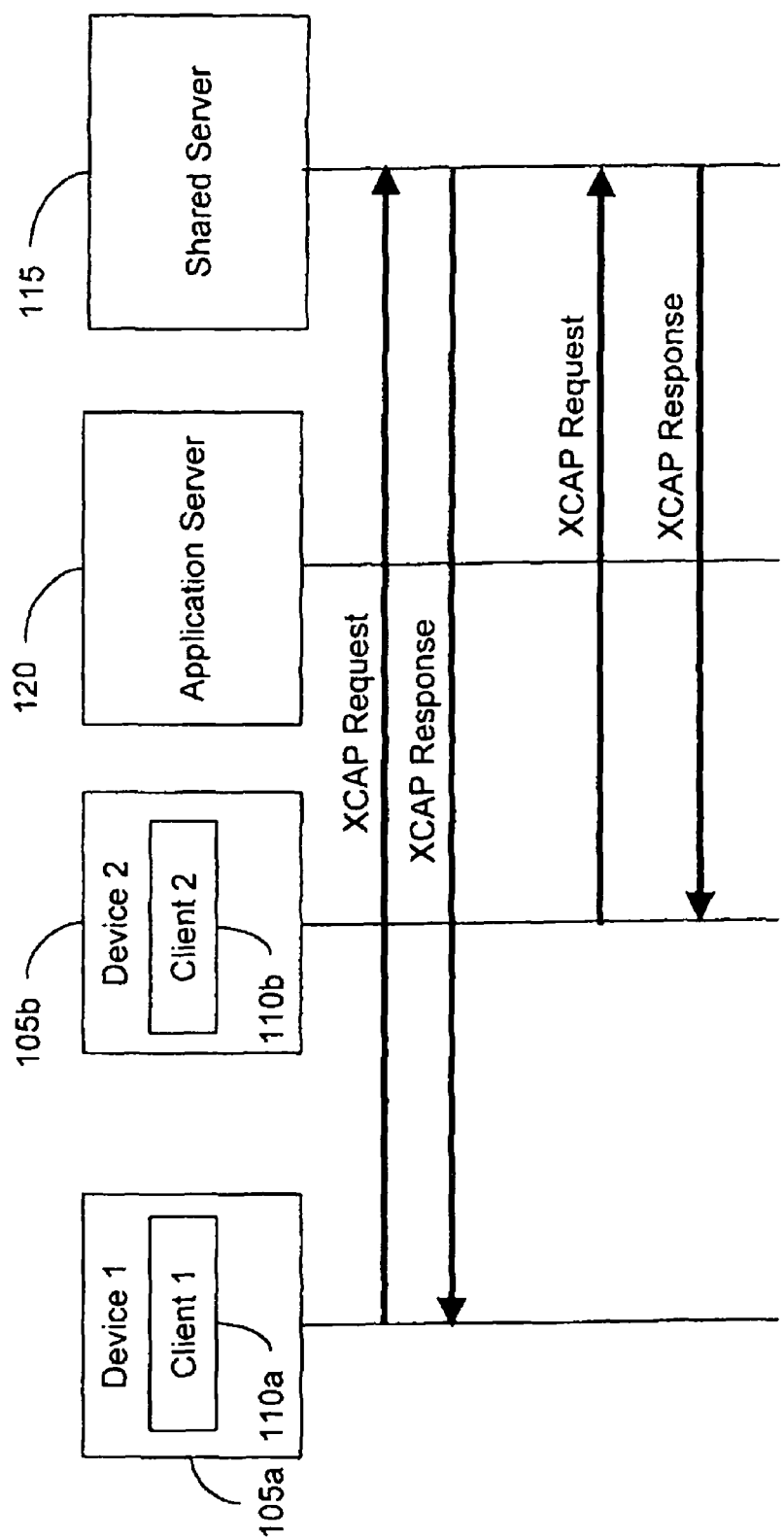
FIG. 2 is a flow diagram illustrating a method for creating and modifying user preference profiles in accordance with various embodiments.

FIG. 2 is a flow diagram illustrating a method for creating and modifying user preference profiles in accordance with various embodiments.

The clients can create the user preference profiles onto the shared server 115 by using XML Configuration Access Protocol (XCAP) PUT method from corresponding devices. The clients then receive 200 OK on successful creation of the user preference profiles.

The clients can read from the user preference profiles created by the clients in the shared server 115. The protocol used by the clients to retrieve the user preference profiles can be XCAP GET. The clients receive data of the user preference profiles in 200 OK responses on successful retrieval operation.

The clients can also change the user preference profiles created by the clients in the shared server 115. The protocol used by the clients to update the user preferences profiles can be XCAP PUT.

A user can have a plurality of devices for example the device 105a and the device 105b in use for a single application and thus may want to set different set of settings in using the application for each device. In one embodiment, to achieve per application and per device setting various profile formats are used. The user preference profiles are stored in these profile formats in the shared server 115. An indication for a user preference profile that needs to be activated for a device is then sent to the application server 120. The user preference profile that needs to be activated is referred to as an active profile after the user preference profile is activated or indicated as an active profile. The application server 120 then fetches or is provided the active profile for the device and implements the preferences of the active profile for the device.

Various profile formats and method for managing user preference profiles for the plurality of devices of the user is explained in detail in conjunction with FIGS. 3a and 3b, FIGS. 4a and 4b and FIG. 5.

Figure 3A:
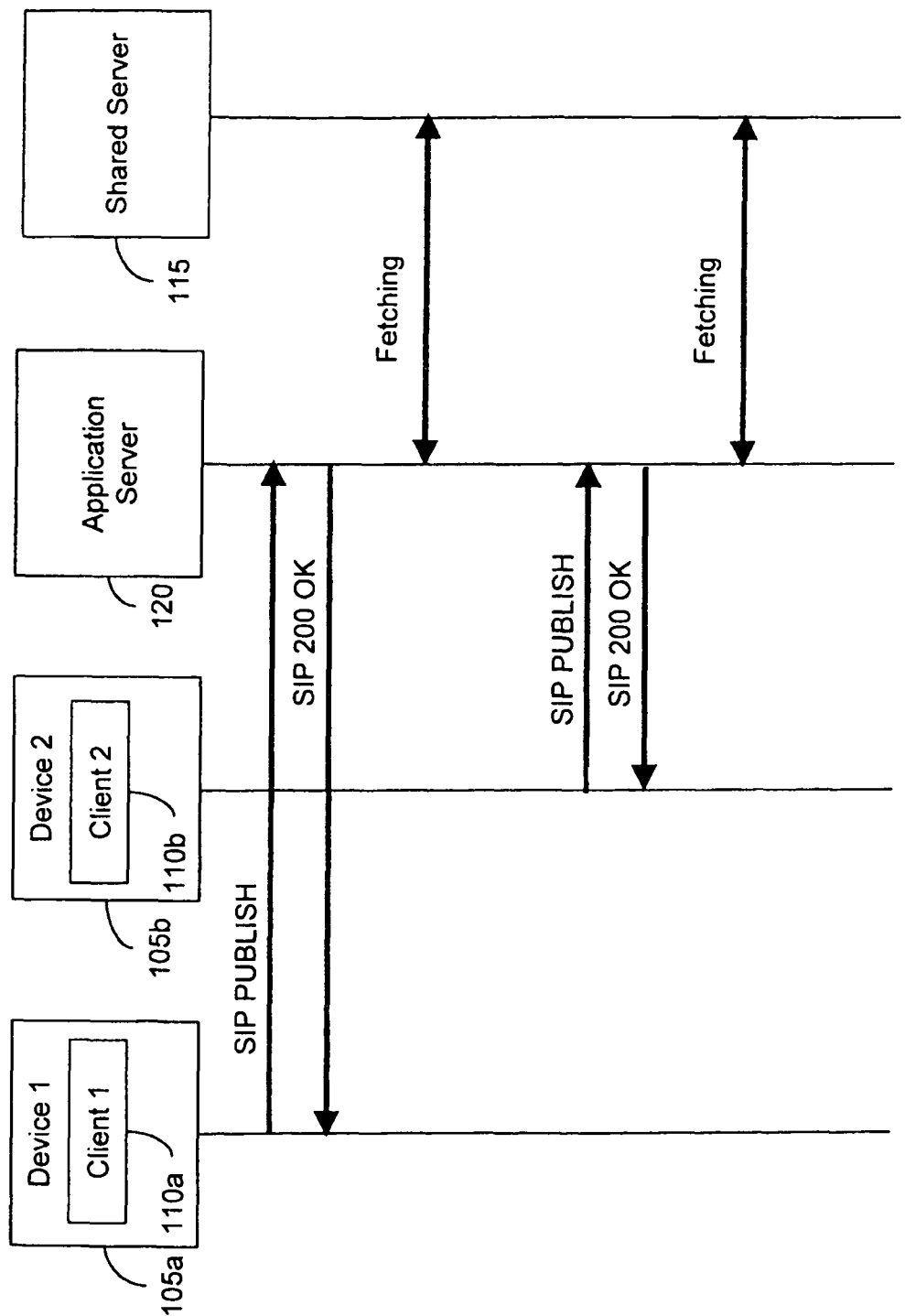
FIGS. 3a and 3b depicts a method for managing user preference profiles for a plurality of devices of a user in a network in accordance with one embodiment.
Figure 3B:
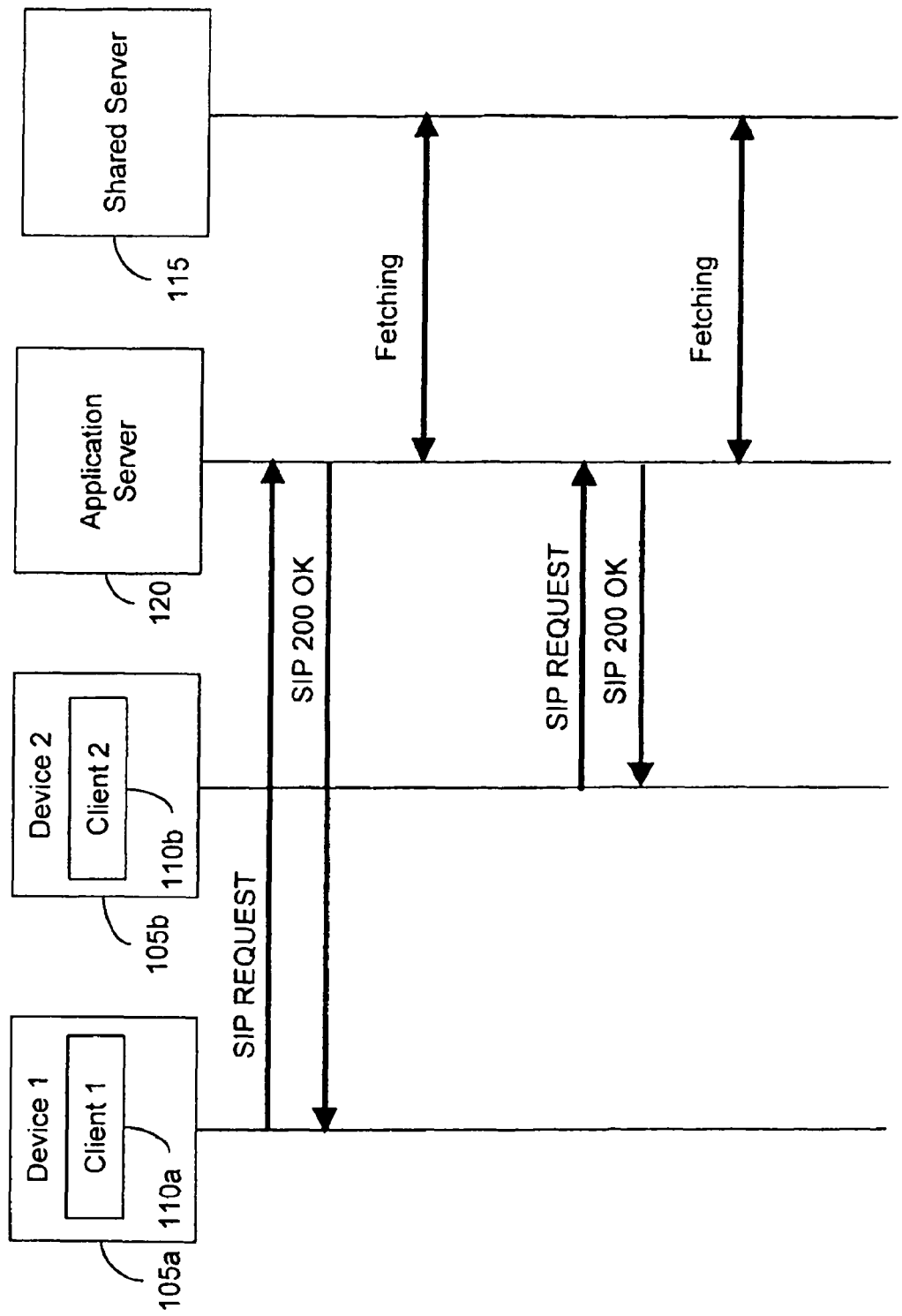

FIGS. 3a and 3b depicts a method for managing user preference profiles for a plurality of devices of a user in a network in accordance with one embodiment.

The clients create various user preference profiles for the plurality of devices of the user. The user preference profiles include a profile format that is independent of a device or is without any active user preference profile information. Table 1 illustrates an exemplary representation of the user preference profiles which are without active user preference profile indication:

TABLE 1

```
<?xml version="1.0" encoding="UTF-8"?>
<service-profile-set user="USER_ADDRESS_OF_RECORD">
    <!-- Profile1 -->
    <service-profile id="xxx" name="PROFILE_1">
        <!-- Service enabler common settings -->
        <common-service-settings>
            <common-service-setting1>value</common-service-setting1>
            <common-service-setting2>value</common-service-setting2>
            <!-- Other settings could be specified further -->
        </common-service-settings>
```

TABLE 1-continued

```
        <!-- Service enabler specific settings -->
        <service-settings service-id="SERVICE_NAME_1">
            <service-setting1>value</service-setting1>
            <service-setting2>value</service-setting2>
            <!-- Other settings could be specified further -->
        </service-settings>
        <!-- Service enabler specific settings -->
        <service-settings service-id="SERVICE_NAME_2">
            <service-setting1>value</service-setting1>
            <service-setting2>value</service-setting2>
            <!-- Other settings could be specified further -->
        </service-settings>
        <!-- Other service enabler specific settings could be specified further -->
    </service-profile>
    <!-- Profile2 -->
    <service-profile id="yyy" name="PROFILE_2">
        <!-- Service enabler common settings -->
        <common-service-settings>
            <common-service-setting1>value</common-service-setting1>
            <common-service-setting2>value</common-service-setting2>
            <!-- Other settings could be specified further -->
        </common-service-settings>
        <!-- Service enabler specific settings -->
        <service-settings service-id="SERVICE_NAME_1">
            <service-setting1>value</service-setting1>
            <service-setting2>value</service-setting2>
            <!-- Other settings could be specified further -->
        </service-settings>
        <!-- Service enabler specific settings -->
        <service-settings service-id="SERVICE_NAME_2">
                <service-setting1>value</service-setting1>
            <service-setting2>value</service-setting2>
            <!-- Other settings could be specified further -->
        </service-settings>
        <!-- Other service enabler specific settings could be specified further -->
    </service-profile>
    <!-- Other profiles could be specified further -->
</service-profile-set>
```

The user preference profiles are stored in the shared server 115. The user preference profiles without active profile indication are created and modified by using, for example method of FIG. 2. A user preference profile that needs to be activated is indicated to the application server 120 for each device of the user. In an embodiment, each client sends a SIP PUBLISH for a new event package called "preference-settings" with a profile identification of the user preference profile that needs to be activated and a device identification for which the user preference profile is to be activated to the application server 120. For example, the client 110*a* sends the device identification for the device 105*a* and the profile identification for Profile 1 to the application server 120. The "preference-settings" can be included in the Event header field present in SIP PUBLISH. The body of the SIP PUBLISH request for the "preference-settings" event includes a preference-settings document in "application or preferences-settings+xml" data format. An exemplary format of the preferences-settings document identified with the MIME type "application or preferences-settings+xml" is illustrated in Table 2.

TABLE 2

```
<?xml version="1.0" encoding="UTF-8"?>
<preferences-settings>
    <target-profile-to-activate         profile_
name="home"            url="org.openmobilealliance.user-
profile/users/sip:jay@example.com/service-setting/~/service-profile-
set[@user="sip:jay@example.com"]/service-profile[@name="home"]"
device-id="unique_identifier"/>
</preferences-settings>
```

The preferences-settings document begins with the root element tag <preferences-settings>. The preferences-settings document also includes a <target-profile> element, including a 'name' attribute that includes a unique identifier of the user preference profile to be activated, 'url' attribute that includes a URL. The URL can be used to locate the user preference profile in the user preference profile present in the shared server 115 of the user and a 'device-id' that includes the SIP URI that can uniquely identify a device that the user is using. The device identification is same as the "Contact" header value in the SIP request. An example of the device identification is GRUU (Globally Routable User Agent URI, draft-ietf-sip-gruu) or any other URI that can uniquely identify the device.

Each client generates a SIP PUBLISH request according to rules and procedures of [RFC3903] and [RFC4353]. Each client also sets the request-URI of the SIP PUBLISH request to the application server 120 identifier or a user address of record, new event "preference-setting", the SIP PUBLISH body and sends the SIP PUBLISH request to the application server 120.

Upon receiving the indication, the application server 120 is provided with the user preference profile. The application server 120 upon receiving the SIP PUBLISH request including active profile indication, processes the SIP PUBLISH request according to rules and procedures of [RFC3903] and if processing of the SIP request is not successful then the method stops. The application server 120 stores the name of the user preference profile that needs to activated as indicated in the body of the SIP PUBLISH request. The application server 120 generates a SIP 200 "OK" response according to rules and procedures of [RFC3261], sends SIP 200 "OK" response to the SIP PUBLISH request. Once the active profile indication is successfully received, the application server 120 requests to fetch the content of the active profile from the shared server 115 using XCAP GET or SIP SUBSCRIBE, provides the content of the requested profile and implements the preferences as indicated in the active profile. In one embodiment, the application server 120 applies the active profile only for the device as indicated in the SIP PUBLISH request from the user. For example, the application server 120 applies the user preference profile requested by client 110*a* to device 105*a* only and the user preference profile requested by client 110*b* to device 105*b* only.

In another embodiment, in addition to using "preference-settings" event publication for the activation of a user preference profile any other kind of SIP methods can also be used to activate a profile. FIG. 3*b* illustrates such a method. For activating a user preference profile which the application server 120 has to implement specific to a device, the client generates a SIP request according to rules and procedures of IETF specifications. The client sets the request-URI of the SIP request to the application server 120 identifier, includes header parameter 'device-id', for example "Contact" header value or gruu or any value provided to help the application server to uniquely identify a device, either in request-URI or Contact header, includes the header parameter "active_profile" indicating the name of the user preference profile that needs to be activated, either in request-URI or Contact header and sends the SIP request to the application server 120.

Upon receiving a SIP request including active profile indication the application server 120 processes the SIP request and if processing of the SIP request is not successful then the method stops. The application server 120 stores the name of the active profile as indicated in the header parameter of SIP request separately for each of the devices having the same user address or different addresses, generates a SIP 200 "OK" response and sends SIP 200 "OK" response to the SIP request. On receiving the SIP 200 "OK" response to the SIP request the client can indicate to the user the successful communication of the user preference profile activation to the application server 120. Upon receiving the profile activation request as above, the application server 120 fetches the corresponding profile from the shared server 115 and applies the user preference profile for the device as indicated in the user preference profile activation request.

It will be appreciated that various SIP based commands can be used for indicating an active profile and providing the active profile to the application server 120.

Figure 4A:
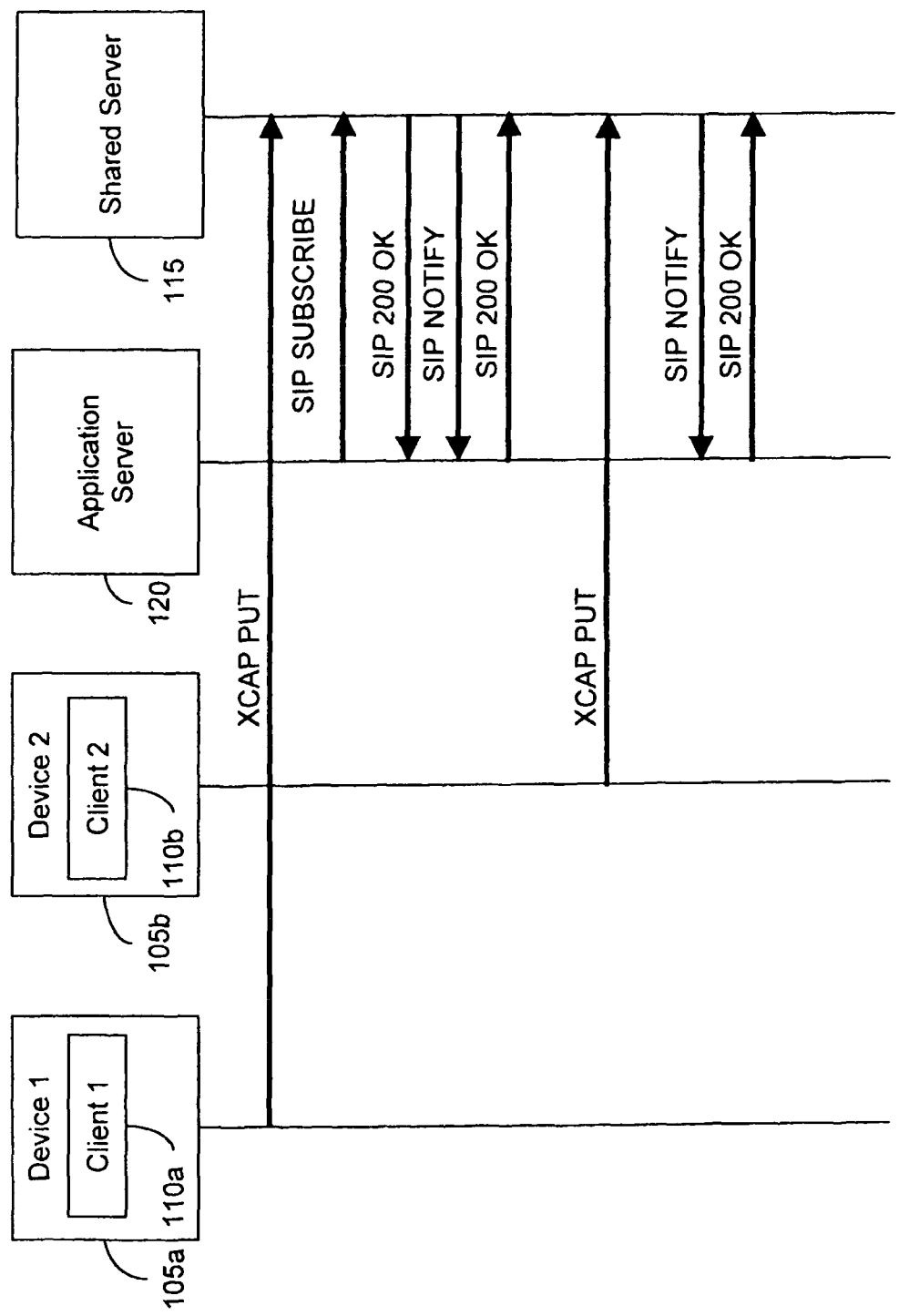
FIGS. 4a and 4b depicts a method for managing user preference profiles for a plurality of devices of a user in a network in accordance with another embodiment.
Figure 4B:
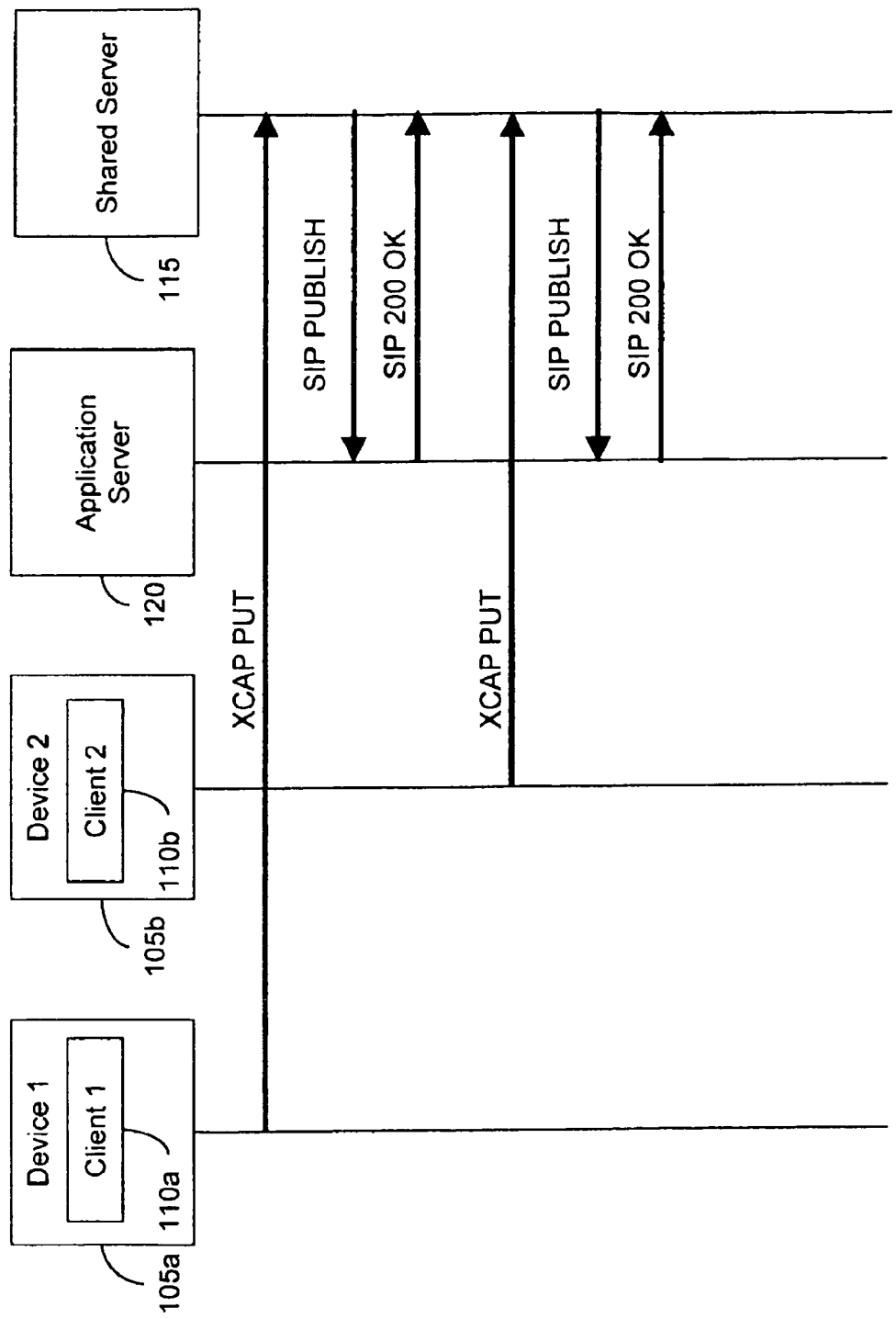

FIGS. 4*a* and 4*b* depicts a method for managing user preference profiles for a plurality of devices of a user in a network in accordance with another embodiment.

The clients create various user preference profiles for the plurality of devices of the user. The user preference profiles include a profile format that includes an active profile indication. In an embodiment, device identification, for example <device-id> element tag, is added in the user preference profile to indicate the user preference profile as the active profile. The profile format that includes the active profile indication is used by the application server 120 to know the preferences to be applied for the device. The value of the device identification can be the value of the "Contact" header used in REGISTER request or the public GRUU. For getting the Public GRUU the procedures as described in draft-ietf-sip-gruu-14 can be followed.

It will be appreciated that the device identification can be any value helping the application server 120 to uniquely identify a device.

The active profile for a particular application for a particular device is identified by the presence of <device-id> element tag in a user preference profile of the particular application, with the value equal to the unique identifier of the device intended to be used. In order to achieve this user client can use XCAP PUT operation. The user client can construct the XCAP PUT URI as described in the section 6 of RFC 4825 [XCAP] so that the <device-id> element tag with the value of unique device identifier is added in the profile of application which the client wants to activate for the particular device.

Table 3 is an exemplary representation of a profile format with target device identification in <device-id> element within the target profile of the application that the user wants to activate for the particular device.

TABLE 3

```
<?xml version="1.0" encoding="UTF-8"?>
<service-profile-set user="USER_ADDRESS_OF_RECORD">
    <!-- Profile1 -->
    <service-profile id="xxx" name="PROFILE_1">
        <!-- The identification of the device for which the service profile described
below is to be applied. -->
        <device-id> contact address or gruu of User's Device 1<device-id>
        <!-- Service enabler common settings -->
        <common-service-settings>
            <common-service-setting1>value</common-service-setting1>
            <common-service-setting2>value</common-service-setting2>
            <!-- Other settings could be specified further -->
        </common-service-settings>
        <!-- Service enabler specific settings -->
        <service-settings service-id="SERVICE_NAME_1">
            <service-setting1>value</service-setting1>
            <service-setting2>value</service-setting2>
            <!-- Other settings could be specified further -->
        </service-settings>
        <!-- Service enabler specific settings -->
        <service-settings service-id="SERVICE_NAME_2">
            <service-setting1>value</service-setting1>
            <service-setting2>value</service-setting2>
            <!-- Other settings could be specified further -->
        </service-settings>
        <!-- Other service enabler specific settings could be specified further -->
    </service-profile>
    <!-- Profile2 -->
    <service-profile id="yyy" name="PROFILE_2">
        <!-- The identification of the device for which the service profile described
```

TABLE 3-continued

```
below is to be applied. -->
        <device-id> contact address or gruu of User's Device 2<device-id>
        <!-- Service enabler common settings -->
        <common-service-settings>
            <common-service-setting1>value</common-service-setting1>
            <common-service-setting2>value</common-service-setting2>
            <!-- Other settings could be specified further -->
        </common-service-settings>
        <!-- Service enabler specific settings -->
        <service-settings service-id="SERVICE_NAME_1">
            <service-setting1>value</service-setting1>
            <service-setting2>value</service-setting2>
            <!-- Other settings could be specified further -->
        </service-settings>
        <!-- Service enabler specific settings -->
        <service-settings service-id="SERVICE_NAME_2">
            <service-setting1>value</service-setting1>
            <service-setting2>value</service-setting2>
            <!-- Other settings could be specified further -->
        </service-settings>
        <!-- Other service enabler specific settings could be specified further -->
    </service-profile>
    <!-- Other profiles could be specified further -->
</service-profile-set>
```

The <device-id> element of the device 105*a* is added for PROFILE_1. The addition indicates that the user wants to activate the PROFILE_1 for the device 105*a*. Similarly, for the device 105*b* the <device-id> element of the device 105*b* is added for PROFILE_2. For the same SERIVCE_NAME_1 application the user can activate the PROFILE_2 for the device 105*b*.

The user preference profiles without active profile indication are created and modified by using, for example method of FIG. 2.

Whenever the application server 120 wants to communicate with any of the devices of a user the application server 120 applies the user preference profile which is set as active by that device. In order to achieve this, the application server 120 should know the active profile set by the corresponding user device.

In an embodiment, the application server 120 can know the active profile by subscribing to the user preference profile changes. The application server 120 can subscribe to the changes made to the active profiles in the user preference profiles as described in the draft draft-urpalainen-sip-xcap-diff-event-01. FIG. 4*a* illustrates the flow for subscription mechanism. The application server 120 is kept updated of the changes made to the active profile in the user preference profiles. Whenever the user sets an active profile the application server 120 can be notified of the changes made to the user preference profiles.

Table 4 is an exemplary representation for "xcap-diff" event SUBSCRIBE request that the application server 120 invokes.

TABLE 4

```
SUBSCRIBE sip:UserPreferenceXDMS@example.com SIP/2.0
Via:        SIP/2.0/TCP       ApplicationServer1.example.com;
branch=z9hG4bKwYb6QREiCL
Max-Forwards: 70
To: <sip:brian @example.com>
From: <sip:brian@example.com>;tag=ie4hbb8t
Call-ID: cdB34qLToC@Application1.example.com
CSeq: 322723822 SUBSCRIBE
Contact: <sip:ApplicationServer1.example.com>
Event: xcap-diff; path="Path_for_activated_profile"
Expires: 7200
Content-Length: 0
```

Further, the SUBSCRIBE request can include the event notification filter per RFC 4660 "Functional Description of Event Notification Filtering" to set a finer condition about the notification of the active profile.

In another embodiment, the shared server 115 does SIP PUBLISH of the user preference profile and the changes. The shared server 115 that stores the user preference profiles delivers the active profile to the application server 120, using the SIP PUBLISH for an event package. FIG. 4*b* illustrates the flow for SIP PUBLISH mechanism. The name of the event package can be called as "user-preferences". The value can appear in the event header field present in SIP PUBLISH.

Table 5 is an exemplary representation of SIP PUBLISH with event "user-preferences".

TABLE 5

```
<?xml version="1.0" encoding="UTF-8"?>
<service-profile-set user="USER_ADDRESS_OF_RECORD">
    <!-- Profile1 -->
    <service-profile id="xxx" name="PROFILE_1">
        <!-- The identification of the device for which the service profile described
below is to be applied. -->
        <device-id> contact address or gruu of User's Device 1<device-id>
        <!-- Service enabler common settings -->
        <common-service-settings>
            <common-service-setting1>value</common-service-setting1>
            <common-service-setting2>value</common-service-setting2>
            <!-- Other settings could be specified further -->
```

TABLE 5-continued

```
        </common-service-settings>
        <!-- Service enabler specific settings -->
        <service-settings service-id="SERVICE_NAME_1">
            <service-setting1>value</service-setting1>
            <service-setting2>value</service-setting2>
            <!-- Other settings could be specified further -->
        </service-settings>
    </service-profile>
</service-profile-set>
```

When the user modifies the user preference profiles by modifying the XML document, the shared server 115 sends a SIP PUBLISH including the contents of the active profile to the application server 120. The "user-preferences" is used as the event package for the SIP PUBLISH and the user preference profile is carried as the payload of the SIP PUBLISH and the content type can be "application or user-preferences+xml".

In an embodiment, the application server 120 allows one profile to be active for a particular device using a particular service. The client when de-registering does a XCAP DELETE operation to remove the <device-id> element tag added by the client during SIP REGISTER.

The shared server 115 takes the responsibility of removing the <device-id> element tags of the devices which loose the registration due to network failure and reboot.

In an embodiment, the user preference profile can include a profile format that is specific to each device of the user. The user preference profiles can be device specific profiles. Each device can have a pool of user preference profiles associated with the device and can choose any one user preference profile from the pool. The exemplary profile format can include:

```
<device-profile id="value1">
    <!--Set of Profiles for this device -->
</device-profile>
<device-profile id="value2">
    <!- Set of Profiles for this device -->
</device-profile>
```

The user can assign device identification for the devices the user is using and the device identification remains same over a period of time. The user preference profiles can be of same name but the characteristics of the user preference profile with same name can differ for different devices. For example, a mobile device using Home profile can have different characteristics from a laptop device using Home profile.

The user preference profiles without active profile indication are created and modified by using, for example method of FIG. 2.

In an embodiment, in order to optimize the storage of user preference profiles a generic pool of user preference profiles as described in FIGS. 3a and 3b can be created and references of the generic pool can be included under a particular device. Apart from having references to common user preference profiles the devices can have the actual profiles having the characteristics specific to that device. An exemplary representation of the profile can include:

```
<device-profile id="value1">
    <!--Set of Profile IDs for this device, contents of which are stored in common pool of profiles -->
    <!- set of profiles specific to this device -->
```

```
-continued
```
```
</device-profile>
<device-profile id="value2">
    <!- Set of Profile IDs for this device , contents of which are stored in common pool of profiles -->
    <!- set of profiles specific to this device -->
</device-profile>
```

It will be appreciated that the indication of the user preference profile for activation when the user preference profile includes the profile format specific to each user device can be similar to the indication technique used for the user preference profiles including active profile indication. Further, the step of providing the active profile to the application server 120 and the steps following the step of providing can also be similar.

It will be appreciated that at any point of time the client can change the active profile. In an embodiment, the old user preference profile can be used for the ongoing sessions and the updated user preference profile can be used for the sessions initiated after changing the active profile. During the session transfer the user preference profiles are applied in such a way that the transferred session is not affected. The user of the device can also be given an option to select the user preference profile to be used for the transferred session.

Figure 5:
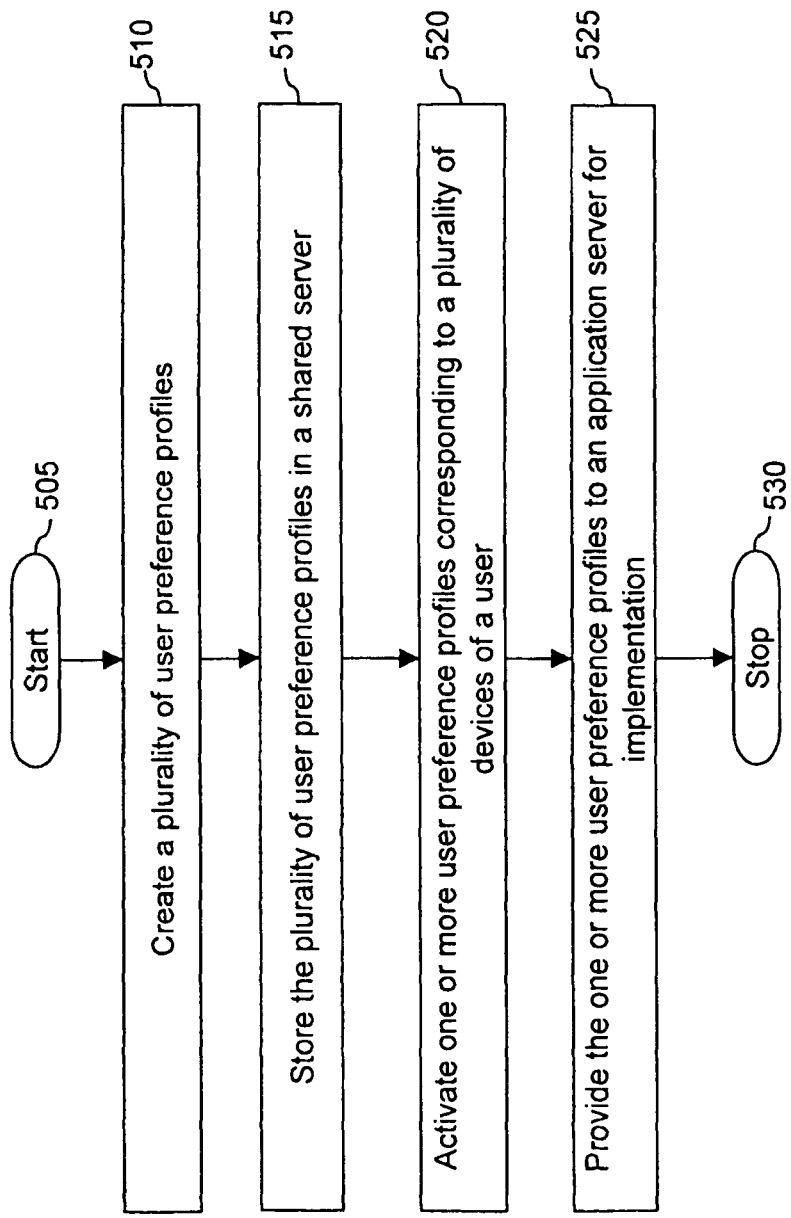
FIG. 5 is a flowchart illustrating a method for managing user preference profiles for a plurality of devices of a user in a network in accordance with various embodiments of the invention.

FIG. 5 is a flowchart illustrating a method for managing user preference profiles for a plurality of devices of a user in a network in accordance with various embodiments of the invention.

The method starts at step 505.

At step 510, a plurality of user preference profiles are created. A user preference profiles includes user preferences, service settings for various applications, rules, preferences, policies or any other preferences or settings that can be set by user. Each user preference profile include at least one of a profile format without active user preference profile indication, a profile format including an active user preference profile indication, and a profile format specific to each device of the user. The profile formats enable the user to set any one user preference profile as an active profile for each of the registered device from the plurality of devices. The profile formats also allow the user to select a user preference profile if the user is registered with multiple addresses from a single device. The user preference profiles are maintained per user address, per device identification and combination thereof.

At step 515, the user preference profiles are stored in a shared server.

At step 520, one or more user preference profiles corresponding to the plurality of devices of the user are activated. In an embodiment, each user preference profile for activation corresponds to a device. One user preference profile can also correspond to multiple devices of the user.

Thereafter, at step 525, the one or more user preference profiles are provided to an application server. The application server implements the preferences included in the user preference profile for corresponding device of the user. In an embodiment, the application server fetches the user preference profiles from the shared server upon receipt of indication of the active profile for a device.

It will be appreciated that the user can register the devices for same or different subscriptions.

It will also be appreciated that various steps of method described in FIG. 5 can be implemented using SIP based commands or XCAP commands.

The method stops at step 530.

The method described above is explained with help of following examples.

A user is registered with a particular subscription id. The user uses the same subscription id with a mobile device and a laptop device. The user can select different user preference profiles for activation corresponding to the mobile device and the laptop device. The user preference profile selected for the mobile device includes mobile specific settings and the user preference profile selected for the laptop device includes laptop specific settings. Moreover, the user can have user preference profile with same name by using the device profile identification profile format.

A user is registered with a particular mobile device. The user can use two different subscription ids, for example, subscription id 1 and subscription id 2 in the mobile device. The user can have different user preference profiles for activation corresponding to subscription id 1 and subscription id 2.

One or more steps of one or more embodiments of the present disclosure can be implemented using a computer system. The computer system includes a processor coupled with a bus for processing information. The computer system can also include a main memory, such as a random access memory (RAM) or other dynamic storage device, coupled to the bus for storing information and instructions to be executed by the processor. The main memory can be used for storing temporary variables or other intermediate information during execution of instructions to be executed by the processor. The computer system can also include a read only memory (ROM) or other static storage device coupled to the bus for storing static information and instructions for the processor. A storage device, such as a magnetic disk or optical disk, can also be provided and coupled to the bus for storing information and instructions. The computer system can be coupled via the bus to a display, and an input device for communicating information and command selections to the processor.

Embodiments of the present disclosure are related to the use of the computer system for implementing the techniques described herein. In one embodiment, the techniques are performed by the processor by executing one or more sequences of one or more instructions included in the main memory. Such instructions can be read into the main memory from another machine-readable medium, such as storage device. Execution of the sequences of instructions included in the main memory causes the processor to perform the method described herein.

The term "machine-readable medium" as used herein refers to any medium that participates in providing data that causes a machine to operation in a specific fashion. In one embodiment which is implemented using the computer system, various machine-readable mediums are involved, for example, in providing instructions to the processor for execution. Such a medium can take many forms, including but not limited to storage media and transmission media. Storage media includes both non-volatile media and volatile media. Non-volatile media includes, for example, optical or magnetic disks, such as storage device. Volatile media includes dynamic memory, such as the main memory. Transmission media includes coaxial cables, copper wire and fiber optics, including the wires that include the bus. Transmission media can also take the form of acoustic or light waves, such as those generated during radio-wave and infra-red data communications. All such media can be tangible to enable the instructions carried by the media to be detected by a physical mechanism that reads the instructions into a machine.

Common forms of machine-readable medium include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read, for example online software, download links, installation links, and online links.

Various profile formats enables the user to have different set of preferences for different devices. The convenience of the user in managing the user preference profiles is also improved.

In the preceding specification, the present disclosure and its advantages have been described with reference to specific embodiments. However, it will be apparent to a person ordinary skilled in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

The invention claimed is:

1. A method for managing user preference profiles of a plurality of devices of a user in a network, the method comprising:
creating a plurality of user preference profiles, wherein each user preference profile comprises service settings for a corresponding application, and the plurality of user preference profiles comprise:
a profile format without active user preference profile indication;
a profile format comprising an active user preference profile indication; and
a profile format specific to each device of the user;
storing the plurality of user preference profiles in a shared server;
activating at least two user preference profiles corresponding to the plurality of devices of the user, wherein the at least two user preference profiles are selected from the plurality of user preference profiles and each user preference profile corresponds to a device from the plurality of devices of the user; and
providing the at least two user preference profiles to an application server,
wherein the application server implements preferences comprised in the at least two user preference profiles.

2. The method of claim 1 further comprising: updating the plurality of user preference profiles.

3. The method of claim 2, wherein the updating is based on Extensible Markup Language Configuration Access Protocol.

4. The method of claim 1, wherein the creating is performed based on Extensible Markup Language Configuration Access Protocol.

5. The method of claim 1, wherein the shared server is an Extensible Markup Language Document Management server.

6. The method of claim 1, wherein the activating comprises: sending a profile identification for the each user preference profile corresponding to the device and a device identification for the device to the application server.

7. The method of claim 6, wherein the sending is based on Session Initiation Protocol.

8. The method of claim 1, wherein the activating comprises: adding a device identification for the device in the each user preference profile corresponding to the device.

9. The method of claim 8, wherein the activating further comprises: performing Extensible Markup Language Configuration Access Protocol based operation to indicate the adding.

10. The method of claim 8, wherein the activating further comprises: subscribing to the each user preference profile by the application server, wherein the subscribing is based on Session Initiation Protocol based subscription.

11. The method of claim 1, wherein the activating comprises: sending a device-profile identification for the device to the application server.

12. The method of claim 1, wherein the providing comprises: fetching the each user preference profile by the application server.

13. The method of claim 12, wherein the fetching is based on Extensible Markup Language Configuration Access Protocol.

14. A method for managing user preference profiles of a plurality of devices of a user in a network, the method comprising:
creating a plurality of user preference profiles, wherein the plurality of user preference profiles comprise:
a profile format without active user preference profile indication;
a profile format comprising an active user preference profile indication; and
a profile format specific to each device of the user;
storing the plurality of user preference profiles in a shared server;
activating one or more user preference profiles corresponding to the plurality of devices of the user, wherein the one or more user preference profiles are selected from the plurality of user preference profiles; and
providing the one or more user preference profiles to an application server,
wherein the application server implements preferences comprised in the one or more user preference profiles.

15. The method of claim 14, wherein each user preference profile further comprises service settings for a corresponding application.

16. A system for managing user preference profiles for a user, the system comprising:
a plurality of devices of the user;
a plurality of clients corresponding to the plurality of devices;
an application server corresponding to the plurality of clients; and
a shared server for storing a plurality of user preference profiles, wherein the plurality of user preference profiles comprise:
a profile format without active user preference profile indication;
a profile format comprising an active user preference profile indication; and
a profile format specific to each device of the user,
wherein each user preference profile comprises service settings for a corresponding application, and each client activates a user preference profile stored in the shared server for a corresponding device and the application server implements preferences comprised in the user preference profile for the corresponding device.

17. The system of claim 16, wherein the shared server is an Extensible Markup Language Document Management server.

* * * * *